United States Patent
Wang et al.

(10) Patent No.: US 9,198,163 B2
(45) Date of Patent: Nov. 24, 2015

(54) SPECTRUM SENSING WITH PARTIAL INFORMATION FEEDBACK IN A COGNITIVE RELAY NETWORK

(71) Applicant: Kabushiki Kaisha Toshiba, Tokyo (JP)

(72) Inventors: Stephen Wang, Bristol (GB); Yue Wang, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 327 days.

(21) Appl. No.: 13/740,425

(22) Filed: Jan. 14, 2013

(65) Prior Publication Data

US 2013/0273833 A1  Oct. 17, 2013

(30) Foreign Application Priority Data

Jan. 16, 2012  (GB) .................... 1200711.8

(51) Int. Cl.
  *H04B 7/15*  (2006.01)
  *H04W 72/00*  (2009.01)
  *H04W 72/04*  (2009.01)
  *H04L 27/00*  (2006.01)
  *H04W 84/04*  (2009.01)

(52) U.S. Cl.
  CPC ....... *H04W 72/0406* (2013.01); *H04L 27/0006* (2013.01); *H04W 84/047* (2013.01)

(58) Field of Classification Search
  None
  See application file for complete search history.

(56) References Cited

U.S. PATENT DOCUMENTS

2011/0122808 A1* 5/2011 Pandharipande et al. ...... 370/315
2011/0217922 A1* 9/2011 Larsson et al. .................... 455/7

FOREIGN PATENT DOCUMENTS

| JP | 2011-30049 A | 2/2011 |
| JP | 2011-66895 A | 3/2011 |
| JP | 2011-629656 A | 12/2011 |
| JP | 2012-509009 A | 4/2012 |
| WO | WO 2010/056180 A1 | 5/2010 |

OTHER PUBLICATIONS

Office Action issued Feb. 4, 2014 in Japanese Patent Application No. 2013-005634 (With English Translation).
Japanese Office Action issued Oct. 28, 2014, in Japan Patent Application No. 2013-005634 (with English translation).

* cited by examiner

*Primary Examiner* — Philip Sobutka (74) *Attorney, Agent, or Firm* — Oblon, McClelland, Maier & Neustadt, L.L.P.

(57) ABSTRACT

A system comprising a source node (11) and a relay node (15a, 15b 15c). The relay node senses a radio spectrum to provide first sensing data indicating the availability of a signal channel at the relay node. The source node senses the radio spectrum to provide second sensing data indicating the availability of the signal channel at the source node. The source node or relay node generates a channel availability parameter based on the first or second sensing data, respectively. The channel availability parameter comprises fewer bits of information than whichever of the first or second sensing data is used to generate the channel availability parameter. The source node determines whether to send message information to the relay node based on a sensing result obtained by combining the channel availability parameter with whichever one of the first and second sensing data is not used to generate the channel availability parameter.

24 Claims, 8 Drawing Sheets

SPECTRUM SENSING WITH PARTIAL INFORMATION FEEDBACK IN A COGNITIVE RELAY NETWORK

FIELD

Embodiments described herein relate generally to methods and systems for cooperative sensing in radio networks.

BACKGROUND

Cognitive radio (CR) is a promising technology that facilitates efficient use of the radio spectrum. In cognitive radio systems, unlicensed users (secondary users) can use a spectrum that has been pre-allocated to licensed users (primary users) when the spectrum is not being used by the primary user.

In some cognitive radio systems, when the secondary users try to access spectrum resources that are pre-assigned to the primary users, the secondary users need to first sense the spectrum and then access the spectrum according to the sensing results. To guarantee the priority of the primary transmission as well as to maintain the transmission of the secondary link, ideally, the secondary user needs to have an accurate and reliable sensing capability in a limited sensing period. In particular, a higher detection probability is desired in order to afford a higher protection level to the primary system while a lower false alarm probability offers a better opportunistic access to secondary users.

Cooperative relaying is a well-known technique that can significantly improve the reliability of the transmission between the source node and the destination node. In relaying networks, a source node is assisted by one or multiple intermediate nodes, referred to as the relay nodes, to deliver information to the destination through one or multiple hop(s). Different relaying (cooperative) protocols have been studied considering how a relay node processes its received signal and forwards such a processed signal to another relay or destination. Such relaying protocols include amplify-and-forward (AF), decode-and-forward (DF), compress-and-forward (CF).

Embodiments described herein may provide a cooperative spectrum sensing method for cognitive relay systems which achieves a trade-off between the sensing performance and the complexity in terms of information feedback.

BRIEF DESCRIPTION OF FIGURES

Embodiments will now be described by way of example with reference to the accompanying drawings in which.

DETAILED DESCRIPTION

A first embodiment comprises a system comprising a source node and a relay node,
  the relay node being configured to perform energy sensing of a radio spectrum to provide first sensing data indicating the availability of a signal channel at the relay node,
  the source node being configured to perform energy sensing of the radio spectrum to provide second sensing data indicating the availability of the signal channel at the source node,
  wherein one or other of the relay node and source node is configured to generate a channel availability parameter based on the first or second sensing data, respectively,
  the channel availability parameter comprising a smaller number of bits of information than whichever of the first or second sensing data is used to generate the channel availability parameter,
  the source node being configured to determine whether to send message information to the relay node based on a sensing result obtained by combining the channel availability parameter with whichever one of the first and second sensing data is not used to generate the channel availability parameter.

The first and second sensing data may comprise soft sensing information i.e. very accurately quantised information. The channel availability parameter may also comprise quantised information; however, the number of bits of information in the channel availability parameter may be less than that of either the first or second sensing data.

In some embodiments, the relay node is configured to generate the channel availability parameter based on the first sensing data and to transmit the channel availability parameter to the source node. The source node may be configured to obtain the sensing result by combining the channel availability parameter with the second sensing data.

In some embodiments, the source node is configured to generate the channel availability parameter based on the second sensing data and to transmit the channel availability parameter to the relay node. The relay node may be configured to obtain the sensing result by combining the channel availability parameter with the first sensing data. The relay node may be configured to transmit the sensing result to the source node.

In some embodiments, the source node and relay node are configured to repeat energy sensing over a plurality of time intervals to thereby provide respective first and second sensing data during each one of the plurality of time intervals. The source node and relay node may each be configured to generate a respective n-bit test statistic based on the average energy sensed in each time interval. The test statistic may indicate the availability of the signal channel at the source node and relay node, respectively. The channel availability parameter may be generated based on the value of the test statistic. The number of bits used to generate the channel availability parameter may be less than n.

In some embodiments, the source node is configured to determine whether to send message information to the relay node based on a sensing result obtained by combining the channel availability parameter with the test statistic of whichever one of the source and relay nodes does not generate the channel availability parameter.

In some embodiments, the number of bits used in the channel availability parameter is dependent on the magnitude of the test statistic generated by the node that generates the channel availability parameter.

In some embodiments, the node used to generate the channel availability parameter defines a first energy threshold. When the test statistic used to generate the channel availability parameter is above the first threshold, the number of bits in the channel availability parameter may be set to a first value. When the test statistic used to generate the channel availability parameter is below the first threshold, the number of bits in the channel availability parameter may be set to a second value.

In some embodiments, the node used to generate the channel availability parameter defines first and second energy thresholds, the second energy threshold being higher than the first energy threshold. When the test statistic used to generate the channel availability parameter is below the first threshold or above the second threshold the number of bits in the channel availability parameter may be set to a first value. When the test statistic used to generate the channel availability parameter is between the first and second thresholds, the number of bits in the channel availability parameter may be set to a second value.

In some embodiments, the second value is greater than the first value.

In some embodiments, the first and second thresholds can be varied by the node used to generate the channel availability parameter.

In some embodiments, the system may comprise a plurality of secondary relay nodes, wherein the relay node forms a respective pair of nodes with each of the secondary relay nodes,
wherein
the source node is configured to generate the channel availability parameter based on the second sensing data and to transmit the channel availability parameter to the relay node,
each one of the secondary relay nodes is configured to perform energy sensing of the radio spectrum to provide sensing data indicating the availability of the signal channel at the respective secondary relay node,
each one of the secondary relay nodes is configured to generate a respective channel availability parameter based on its respective sensing data, wherein each channel availability parameter comprises a smaller number of bits of information than the sensing data used to generate the respective channel availability parameter,
each one of the secondary relay nodes being configured to transmit its respective channel availability to the relay node,
the relay node being configured to obtain a respective sensing result for each secondary relay node by combining the respective channel availability parameter with the first sensing data,
the relay node being further configured to transmit the respective sensing result to the source node.

Another embodiment provides a system comprising a plurality of relay nodes, the source node forming a respective pair of nodes with each one of the relay nodes,
wherein for each pair of nodes:
the relay node is configured to perform energy sensing of the radio spectrum to provide first sensing data indicating the availability of a signal channel at the relay node,
the source node is configured to perform energy sensing of the radio spectrum to provide second sensing data indicating the availability of the signal channel at the source node,
wherein one or other of the relay node and source node is configured to generate a channel availability parameter based on the first or second sensing data, respectively,
the channel availability parameter comprising a smaller number of bits of information than whichever of the first or second sensing data is used to generate the channel availability parameter,
the source node being configured to determine whether to send message information to the relay node based on a sensing result obtained by combining the channel availability parameter with whichever one of the first and second sensing data is not used to generate the channel availability parameter.

Another embodiment provides a signal node for communicating with a second signal node in a network, the second signal node being configured to perform energy sensing of a radio spectrum to provide first sensing data indicating the availability of a signal channel at the second signal node and to generate a channel availability parameter based on the first sensing data, the channel availability parameter comprising fewer bits of information than the first sensing data, wherein
the signal node is configured to perform energy sensing of the radio spectrum to provide second sensing data indicating the availability of the signal channel at the signal node, and
the signal node is configured to receive the channel availability parameter from the second signal node and to combine the channel availability parameter with the second sensing data to obtain a sensing result, the sensing result being used to determine whether or not information is to be exchanged between the signal node and second signal node using the signal channel.

Another embodiment provides a signal node for communicating with a second signal node in a network, the second signal node being configured to perform energy sensing of a radio spectrum to provide first sensing data indicating the availability of a signal channel at the second signal node and to combine information received from the signal node with the first sensing data to obtain a sensing result, the sensing result being used to determine whether information is to be exchanged between the signal node and second signal node across the signal channel,
wherein
the signal node is configured to perform energy sensing of the radio spectrum to provide second sensing data indicating the availability of the signal channel at the signal node and to generate a channel availability parameter based on the second sensing data, the channel availability parameter comprising fewer bits than the second sensing data,
the signal node being configured to transmit the channel availability parameter to the second signal node to be combined with the first sensing data in order to obtain the sensing result.

Another embodiment provides a method for determining whether to transmit message information from a source node to a relay node in a network, the method comprising:
performing energy sensing of a radio spectrum at the relay node to provide first sensing data indicating the availability of a signal channel at the relay node,
performing energy sensing of the radio spectrum at the source node to provide second sensing data indicating the availability of the signal channel at the source node,
using the first or second sensing data to generate a channel availability parameter for the relay node or source node respectively, the channel availability parameter comprising a smaller number of bits of information than whichever of the first or second sensing data is used to generate the channel availability parameter,
transmitting the channel availability parameter from whichever one of the source or relay node is used to generate the channel availability parameter to the other of the source or relay node,
obtaining a sensing result by combining the channel availability parameter with whichever of the first or second sensing data is not used to generate the channel availability parameter,
determining whether to send message information from the source node to the relay node based on the sensing result.

In some embodiments the channel availability parameter is generated using the first sensing data, the channel availability parameter being transmitted from the relay node to the source node. The sensing result may be obtained by combining the channel availability parameter with the second sensing data.

In some embodiments, the channel availability parameter is generated using the second sensing data. The channel availability parameter may be transmitted from the source node to the relay node. The sensing result may be obtained by combining the channel availability parameter with the first sensing data. The sensing result may be transmitted from the relay node to the source node.

In some embodiments, energy sensing at the source node and relay node is repeated over a plurality of time intervals to thereby provide respective first and second sensing data during each one of the plurality of time intervals. A respective n-bit test statistic may be generated for the source node and relay nodes, wherein the test statistic is based on the average energy sensed in each time interval. The channel availability parameter may be generated based on the value of the test statistic. The number of bits used to generate the channel availability parameter is less than n.

In some embodiments, the sensing result is obtained by combining the channel availability parameter with the test statistic of whichever one of the source and relay nodes does not generate the channel availability parameter.

In some embodiments, the number of bits used in the channel availability parameter is dependent on the energy sensed by the node that generates the channel availability parameter.

In some embodiments, a first energy threshold may be defined at the node used to generate the channel availability parameter. When the test statistic used to generate the channel availability parameter is above the first threshold, the number of bits in the channel availability parameter may be set to a first value. When the test statistic used to generate the channel availability parameter is below the first threshold, the number of bits in the channel availability parameter may be set to a second value.

In some embodiments, first and second energy thresholds may be defined at the node used to generate the channel availability parameter, the second energy threshold being higher than the first energy threshold. When the test statistic used to generate the channel availability parameter is below the first threshold or above the second threshold the number of bits in the channel availability parameter may be set to a first value. When the test statistic used to generate the channel availability parameter is between the first and second thresholds, the number of bits in the channel availability parameter may be set to a second value.

In some embodiments, the source node and relay node form part of a cognitive relay system in which the source and relay nodes operate together with a destination node as a secondary network system. It may be desirable for the source node to obtain fairly accurate information of spectrum availability before it can transmit the signals. All the other nodes in the secondary network are potential relays. These relay nodes will also have capabilities of spectrum sensing, and the information can be helpful to improve the sensing performance at the source node. Sensing information obtained at the relay nodes can, for example, be quantised and transmitted to the source node as a channel availability parameter in order to reduce the amount of feedback required, whilst there is still a purely soft version of the sensing information retained in the source node itself. Such information can then be taken advantage of when global decisions are made.

Embodiments are able to utilise such soft information to enhance the performance of spectrum sensing. Embodiments of the present invention combine quantised sensing information in the form of a channel availability parameter from one or other of the relay node and source node with soft sensing information from the other one of the source node and relay node in order to achieve an enhanced sensing performance whilst at the same time reducing the number of bits of information that must be transmitted between the source and relay nodes.

In some embodiments, the source node may be used to send out a message to a destination node. To avoid causing interference to the primary system as well as to the other secondary users, it is desirable for the source node to have knowledge of the usage of the channel before it can send the data to the destination node. All the other nodes in the network are the potential relay nodes. They can also sense the spectrum, and the sensing information can be passed to the source node.

Figure 1:
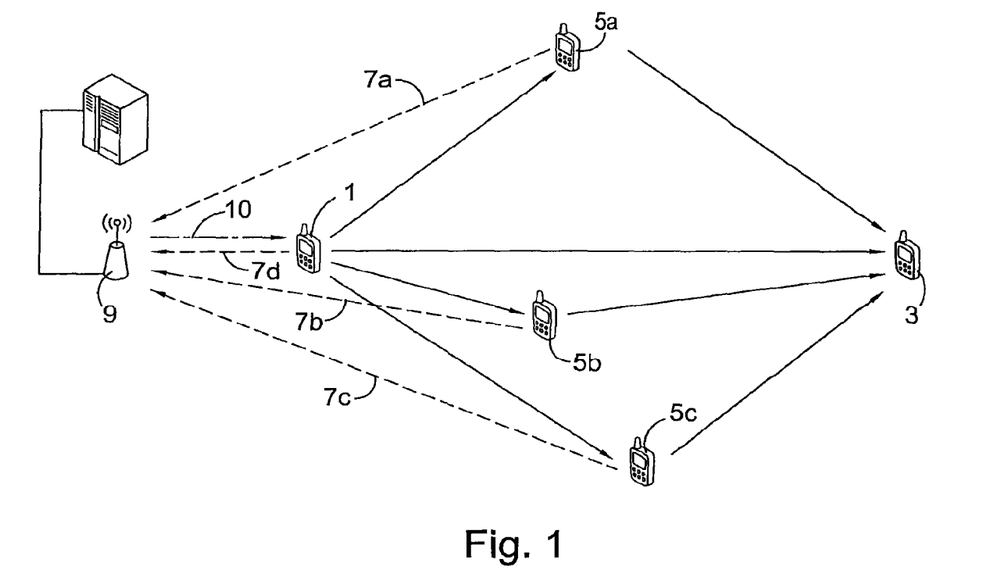
FIG. 1 is a schematic of a conventional sensing scheme in a cognitive radio network.

FIG. 1 shows a sensing information process in a conventional cognitive radio network. In the arrangement shown in FIG. 1, a source node 1 is used to transmit information to a destination node 3 via one or more relay nodes 5$a$, 5$b$, 5$c$. As shown by arrows 7$a$, 7$b$, 7$c$ and 7$d$, the relay nodes and source node each relay sensing information to a fusion centre 9. On the basis of the information received from the source node and relay nodes, the fusion centre 9 carries out a global sensing decision, the result of which is forwarded to the source node, as shown by an arrow 10. The source node may use the result of the global decision to determine which relay node to use in order to transmit data to the destination node 3.

Cooperation among the secondary users in a cognitive radio network improves the performance of the spectrum sensing. In general, cooperative sensing exploits the spatial dimension via cooperation. Therefore it reduces the probability that users experience poor channel operating conditions.

Usually with cooperative sensing in a cognitive radio network, the sensing information (test statistic) from different sensing nodes is transmitted to a fusion centre which makes a final binary decision of whether or not the primary user is present. Generally speaking, there are two ways of transmitting the test statistic: 1) the sensing nodes will feedback the pure soft sensing (very accurately quantised) information;

and 2) the sensing nodes only feedback quantised information using several bits (e.g., one bit to indicate a local decision). The fusion centre will then make a global decision according to, for example, the majority rule. The first feedback method provides an improved sensing accuracy at the cost of complexity in terms of the amount of the feedback information required, especially when the number of relay nodes is large. The second method suffers from a degraded sensing performance.

Examples of using quantised sensing information in cognitive radio networks have been proposed. For example, a method of using a double-threshold mechanism with quantised soft decision combining has been proposed. The double-threshold mechanism can be further improved by using adaptive thresholds. In another example, a double-threshold mechanism that does not include using a quantisation process has been proposed; here, a 'no decision' region between two thresholds is introduced, and when sensed observations fall into this region, full information will be sent from the nodes to the fusion centre. When the sensed observations fall into the region outside the "no decision" region, a 1-bit local decision is sent.

A cluster-based cooperative sensing scheme has been proposed whereby each cluster head passes its local sensing decision to a fusion centre, which then aggregates the cluster-level information, and makes a decision across multiple, or all of, the clusters whether the primary user is absent based on a decision fusion function by applying an OR-rule to all the decisions in the cluster.

In each of the examples above, the fusion centre itself is provided without sensing capability but simply carries out the decision making process. In addition, a simple fusion rule, e.g. OR rule, is applied in the fusion centre.

Figure 2:
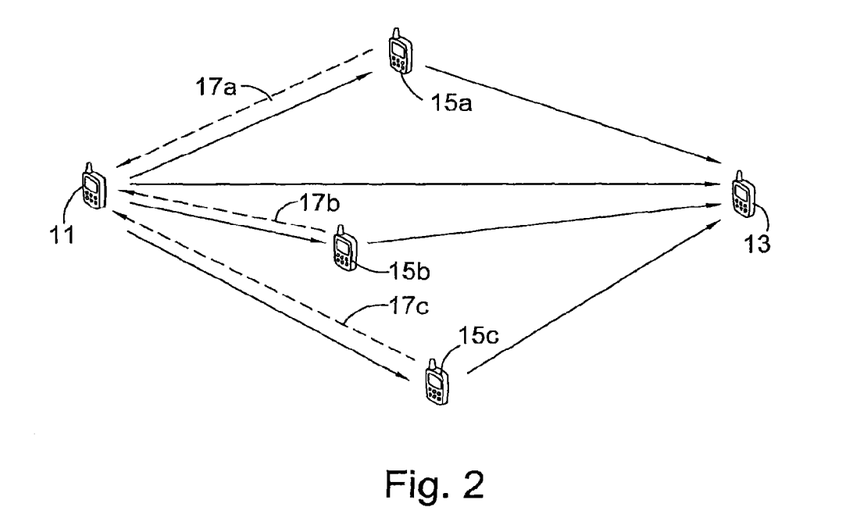
FIG. 2 is a schematic of an information sensing scheme in accordance with an embodiment.

FIG. 2 shows a sensing information scheme according to a particular embodiment of the present invention. In the network shown in FIG. 2, source node 11 transmits information to destination node 13 via one of several relay nodes 15a, 15b, 15c.

As shown by arrows 17a, 17b and 17c, the relay nodes 15a, 15b and 15c transmit quantized sensing information in the form of a channel availability parameter to the source node. The source node combines each channel availability parameter received from the relay nodes with its own soft sensing information to generate a sensing result. Based on the sensing result, the source node can decide which of the relay nodes to use to transmit data to the destination node.

The cognitive relay network may have M nodes for cooperative sensing. One of these nodes may act as the source node, $S_1$, and the rest M−1 nodes may act as relay nodes, $R_m$, (m=2,3..., M). The relay nodes perform spectrum sensing and send quantised sensing information in the form of a channel availability parameter to the source node. The source node also performs spectrum sensing. It may de-quantise the information received from the relay nodes, and combine the restored information with its own sensing information (soft information) to make a global decision on whether the spectrum is available.

Energy detection may be used to sense the channel during the sensing slot for the relay nodes and the source node. The sensing process may be formulated as a binary hypothesis test between the presence and absence of the primary transmission, denoted as $\mathcal{H}_1$ and $\mathcal{H}_0$, given by:

$$\mathcal{H}_1: y_m(n) = h_m s(n) + u_m(n) \quad (1)$$

$$\mathcal{H}_0: y_m(n) = u_m(n) \quad (2)$$

Where sensing data $y_m(n)$ is the $n^{th}$ sample received by the $m^{th}$ secondary user (m=1,2,..., M), s(n) is the $n^{th}$ symbol transmitted by the primary user during the sensing slot with a transmission power of $\sigma_s^2$ and $u_m(n)$ is the $n^{th}$ noise sample during the sensing slot, which is assumed to be an independent complex Gaussian random variable with a mean of zero and a variance of $\sigma_u^2$, and is independent of s(n). In addition, $h_m$ denotes the complex channel coefficient from the primary user's transmit antenna to the $m^{th}$ secondary user. It is assumed that that for a given secondary user, e.g., the $m^{th}$ secondary user, $h_m$ is a complex Gaussian random variable with zero mean and unit variance, which remains invariant during one sensing slot.

In some embodiments, the initial (soft) sensing data obtained by the source node and relay node may be used to generate a respective test statistic for the source node and relay node. Each test statistic may represent the energy sensed by the nodes as a single n-bit value, where n is a predetermined number of bits. The test statistic may be generated by sensing the radio spectrum over a predetermined number of time intervals and determining the average energy sensed in each time interval. The number of bits in the channel availability parameter may then be determined by the magnitude of the test statistic. The number of bits used in the channel availability parameter may be less than n.

For example, the test statistic for energy detection used by each node, e.g., the $m^{th}$ node, may be given by:

$$T_m(y) = \frac{1}{N} \sum_{n=1}^{N} |y_m(n)|^2 \quad (3)$$

where $N = \tau f_s$ is the number of samples in each sensing slot period $\tau$, and $f_s$ is the sampling frequency.

Figure 3:
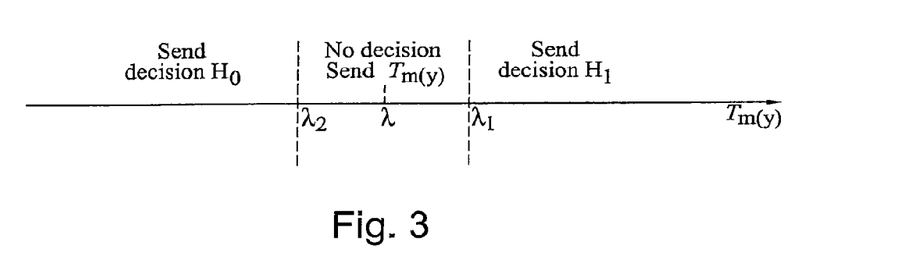
FIG. 3 shows a conventional multi-threshold sensing scheme in which sensing information is acquired by each node and relayed to a fusion centre.
Figure 4A:
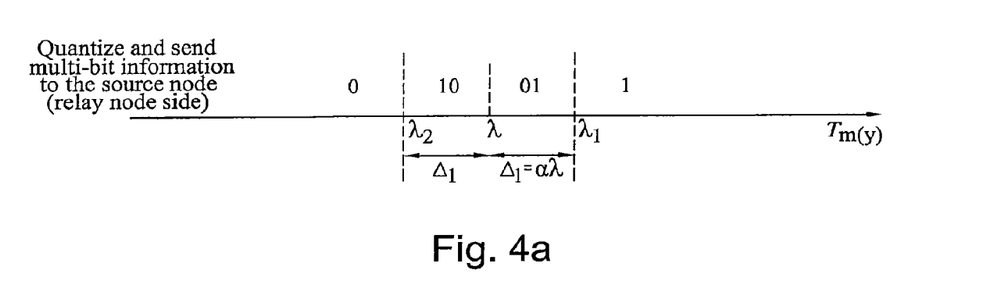
FIG. 4A shows an information sensing scheme according to an embodiment.

FIG. 3 shows a conventional multi-threshold sensing scheme in which sensing information is acquired by each node and relayed to a fusion centre. For each node, it is possible to define an upper and lower threshold for the signal sensed by that node by reference to a threshold coefficient $\alpha$. Referring to FIG. 4(a), the region between the two thresholds is set as $2\Delta_1$ where $\Delta_1 = \alpha\lambda$, and where $\lambda_2 = \lambda - \Delta_1$ and $\lambda_1 = \lambda + \Delta_1$. The region between the two thresholds is termed the uncertainty region.

In the conventional scheme shown in FIG. 3, each of the m nodes sends its sensing information to a fusion centre. Here, the local sensing decision $L_m$ is made by comparing $T_m(y)$ with two thresholds $\lambda_1$ and $\lambda_2$. If $\lambda_2 < T_m(y) \leq \lambda_1$, the $m^{th}$ sensing node will send its test statistic $T_m(y)$ (k bit signaling cost) to the fusion centre. If $T_m(y) > \lambda_1$, the $m^{th}$ sensing node reports $\mathcal{H}_1$ (1 bit signaling cost) to the fusion centre. If $T_m(y) \leq \lambda_2$, the $m^{th}$ sensing node reports $\mathcal{H}_0$ (1 bit signaling cost) to the fusion centre. The fusion centre may, for example, receives K k-bit test statistics and (M−K) 1-bit local decisions. The fusion centre may then make an upper decision according K k-bit test statistics, which is given by:

$$D = \begin{cases} 0, & \frac{1}{K}\sum_{m=1}^{K} T_m(y) \leq \lambda \\ 1, & \frac{1}{K}\sum_{m=1}^{K} T_m(y) > \lambda \end{cases} \quad (4)$$

where λ can be determined based on the target detection probability or the target false alarm probability according to the threshold setting criteria. The fusion centre may then make a global decision G as defined by:

$$G = \begin{cases} 0, & \text{otherwise} \\ 1, & D + \sum_{m=1}^{M-K} L_m > 1 \end{cases} \quad (5)$$

Figure 4B:
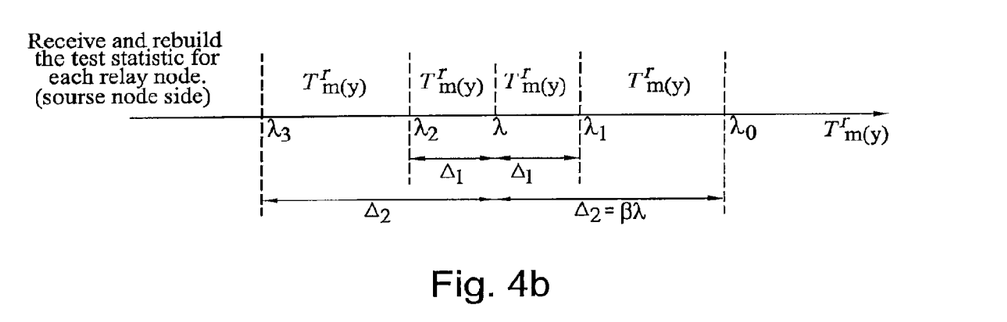
FIG. 4B shows an information sensing scheme according to an embodiment.

FIG. 4 shows an information sensing scheme according to a particular embodiment, in which a test statistic restoration process takes place.

Figure 5:
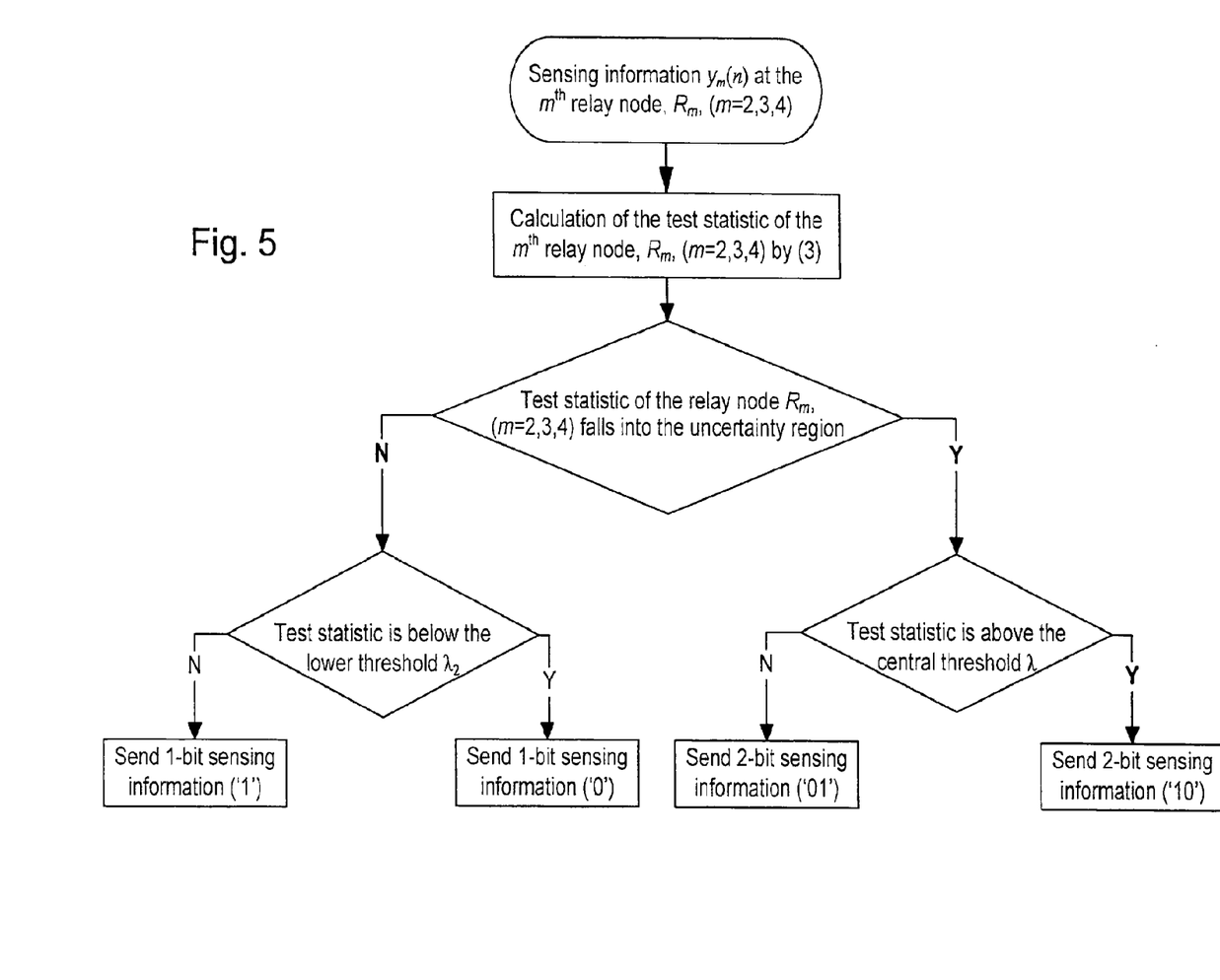
FIG. 5 shows a flowchart of an information sensing process carried out by a relay node in accordance with an embodiment.

FIG. 4(a) shows the functionality of a relay node as used in a sensing scheme according to a particular embodiment (a flow chart of this functionality is shown in FIG. 5). For the relay node, similar double thresholds are chosen to those applied in the conventional scheme shown in FIG. 3. However, unlike the case shown in FIG. 3, the relay node sends a channel availability parameter to the source node, instead of sending the test statistic. In particular, If $\lambda < T_m(y) \le \lambda_1$ or $\lambda_2 < T_m(y) \le \lambda$, a 2-bit quantised information channel availability parameter $L_m$ (e.g. 01 or 10) is sent by the relay node to the source node. If $T_m(y) > \lambda_1$ or $T_m(y) \le \lambda_2$, a 1 bit local decision $L_m$ (e.g. 0 or 1) channel availability parameter is sent by the relay node to the source node.

The scheme shown in FIG. 4 also differs from the conventional sensing scheme shown in FIG. 3 in that the source node of the proposed scheme will not only act as a fusion centre but also a sensing node carrying out the sensing task. The source node may combine its own test statistic with the sensing information received by the relay nodes in order to make a global decision.

Figure 6:
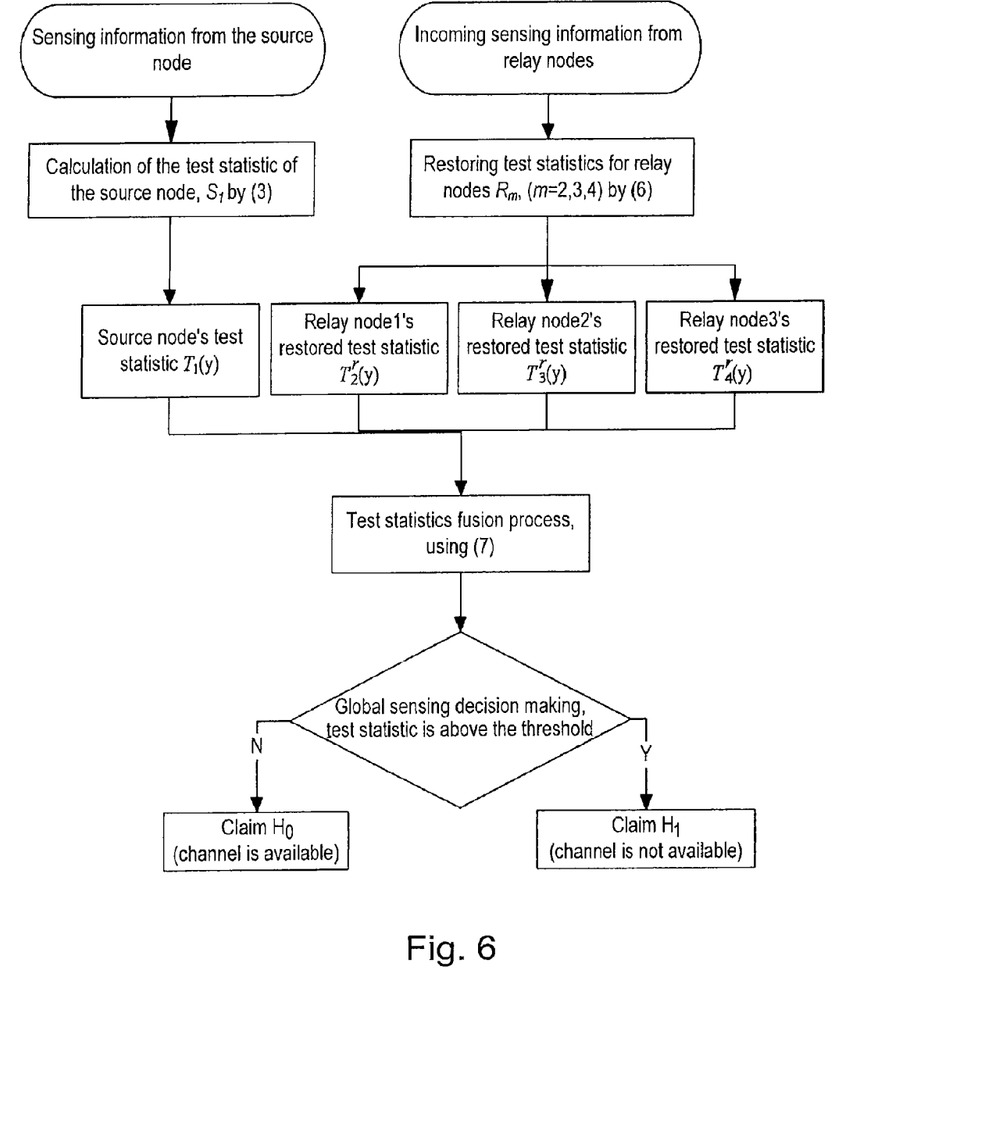
FIG. 6 shows a flowchart of an information sensing process carried out by a source node in accordance with an embodiment.

FIG. 4(b) shows the functionality of a source node as used in a sensing scheme according to a particular embodiment. A flow chart of this functionality is also shown in FIG. 6. In the conventional cooperative spectrum method, 2 bit quantised information from all sensing nodes are summed up by a fusion centre as integer values and compared with a threshold. In contrast, in the embodiment shown in FIG. 4(b), the source node is used to de-quantise the channel availability parameters received from the relay nodes and to rebuild a test statistic $T_m^r(y)$ for each relay node.

As shown in FIG. 4(b), the test statistic restoration process carried out by the source node is realised by introducing a new threshold coefficient β at the source node side, along with a restoration region $\Delta_2 = \beta \lambda$. Thus, the rebuilt test statistic for $m^{th}$ relay node is given by:

$$T_m^r(y) = \begin{cases} \dfrac{\lambda_3 + \lambda_2}{2}, & L_m = 0 \\ \dfrac{\lambda_2 + \lambda}{2}, & L_m = 01 \\ \dfrac{\lambda + \lambda_1}{2}, & L_m = 10 \\ \dfrac{\lambda_1 + \lambda_0}{2}, & L_m = 1 \end{cases} \quad (6)$$

where m=2, . . . , M, and two edge points are calculated as $\lambda_3 = \lambda - \Delta_2$ and $\lambda_0 = \lambda + \Delta^2$.

After restoring all the test statistics of the relay nodes, a global sensing decision may be made by the source node according to the following test statistic:

$$T(y) = g_1^2 T_1(y) + \sum_{m=2}^{M} g_m^2 T_m^r(y) \quad (7)$$

where $g_m$ is the weighting factor for the $m^{th}$ node, $$g_m = g_1 = \frac{1}{\sqrt{M}}$$

for equal gain combining.

$$T_1(y) = \frac{1}{N} \sum_{n=1}^{N} |y_1(n)|^2$$

is test statistic of the source node, and the source node decides whether a primary user is present or not by comparing T(y) with a threshold λ.

The proposed test statistic restoration process can also be carried out by an independent fusion centre in the conventional system architecture (FIG. 1) where the global sensing decision is then passed to the source node by the independent fusion centre. The compatibility of this proposed restoration process makes it feasible to reuse the existing system entities with no hardware modification. Meanwhile, it improves the system performance.

As can be seen from above, the signalling cost will depend on the size of the uncertainty region of $2\Delta_1$. Therefore, the signalling cost of cooperative sensing for each sensing slot can also be calculated. To begin with, the probability of $\lambda_2 < T_m(y) \le \lambda_1$ for the $m^{th}$ node under hypothesis $\mathcal{H}_0$ and $\mathcal{H}_1$ is defined as follows:

$$p_m^0 = P(\lambda_2 < T_m(y) \le \lambda_1 | \mathcal{H}_0) \quad (8)$$

$$p_m^1 = P(\lambda_2 < T_m(y) \le \lambda_1 | \mathcal{H}_1) \quad (9)$$

For the conventional sensing scheme, when the test statistic $T_m(y)$ falls into this region, a k-bit test statistic will be sent from the sensing node to the fusion centre. The signalling cost generated between the sensing nodes and the fusion centre can be calculated as follows:

$$\Psi(P(\mathcal{H}_1) + P(\mathcal{H}_0) = 1) = \sum_{m=1}^{M} (kP_m + 1(1 - P_m)) \quad (10)$$

where $P_m = P_m^0 P(\mathcal{H}_0) + P_m^1 P(\mathcal{H}_1)$, the value k denotes k-bit test statistics, the value 1 refers to 1-bit local decisions, and $P(\mathcal{H}_0)$, $P(\mathcal{H}_1)$ are prior probabilities of the respective hypotheses. Note that a higher $P_m$ may lead to a better sensing performance while it also results in a heavier signalling cost.

In embodiments described herein, the signalling cost generated between the source node and relay nodes may be calculated as follows:

$$\Psi = \sum_{m=2}^{M} (2P_m + 1(1 - P_m)) \quad (11)$$

Figure 7:
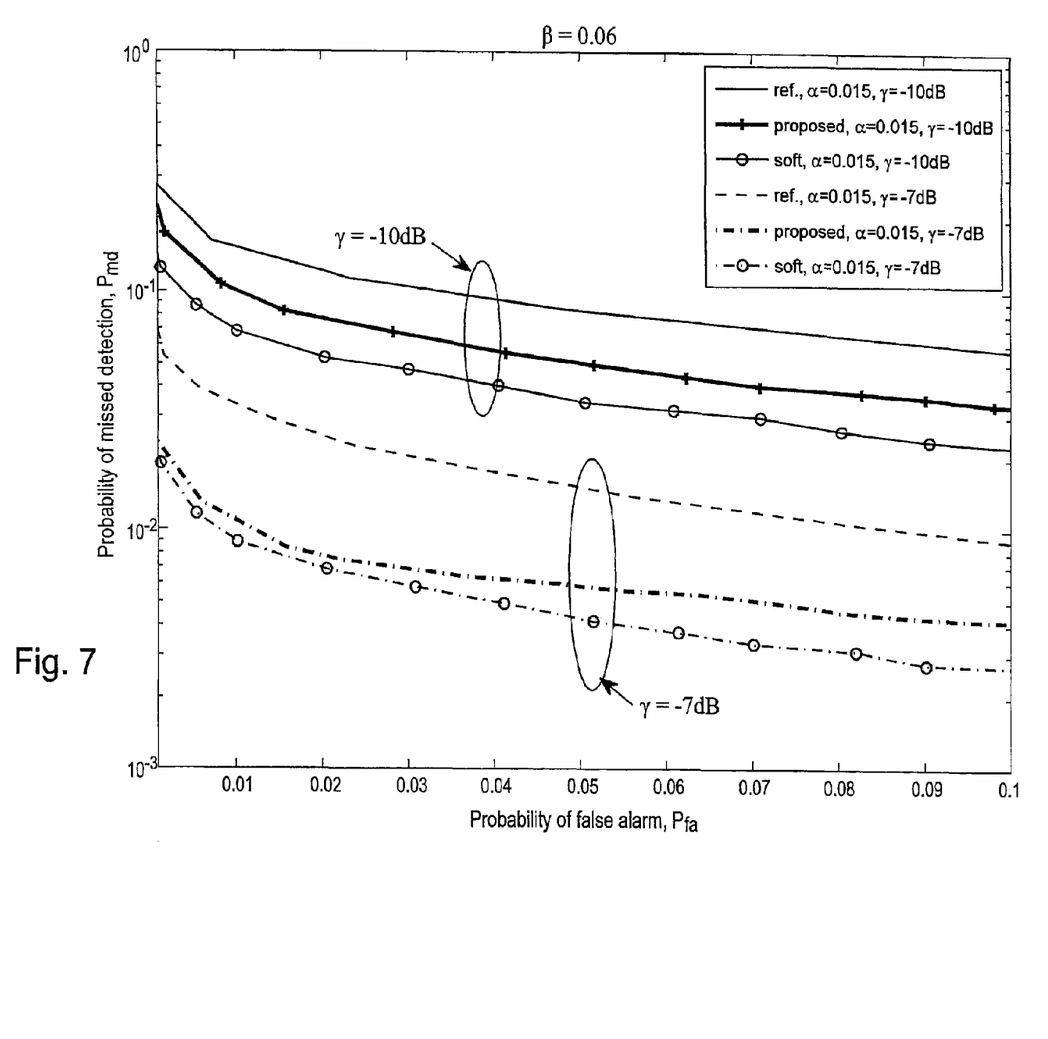
FIG. 7 shows performance comparisons under different SNR environments for embodiments.

Given a required probability of false alarm $P_{fa}$, the sensing performance in terms of the probability of missed detection $P_{md}$ under different SNR environments can be calculated. Results are shown in FIG. 7, where a curve with a lower missed detection probability in the figure indicates a system with better sensing performance. As expected, a higher SNR (e.g., $\gamma=-7$ dB) leads to a lower $P_{md}$ for any given $P_{fa}$.

With the same SNR value, the scheme provides a better sensing performance (with a lower missed detection probability) than the conventional multi-threshold sensing scheme. FIG. 7 also shows that the best sensing performance is achieved by using the full-soft scheme at the price of the highest signalling cost between relay nodes and source node.

Figure 8:
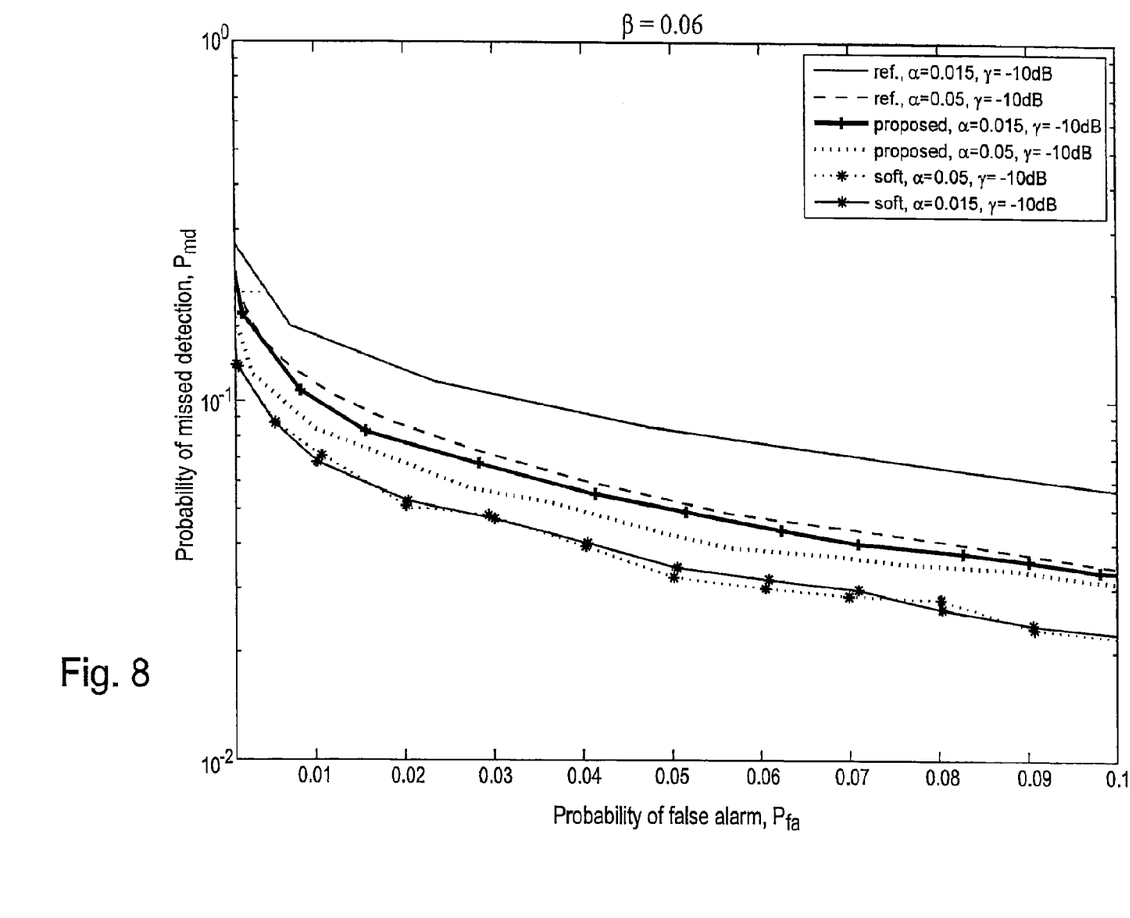
FIG. 8 shows the impact on sensing performance when varying the size of an uncertainty region in a sensing scheme according to an embodiment.

FIG. 8 shows the impact on sensing performance when varying the size of the uncertainty region. As shown in FIG. 8, the sensing performance can be improved by expanding the size of the uncertainty region (e.g. by increasing α from 0.015 to 0.05). Increasing the size of the uncertainty region means that a greater amount of sensing information will be sent from the relay nodes to the source node. The reason behind this is that where a test statistic falls within the uncertainty region, the number of bits of information used to encode the test statistic will exceed the number of bits used to encode test statistics that fall outside the uncertainty region. Expanding the size of the uncertainty region will mean that a greater proportion of test statistics fall within the uncertainty region. On average, therefore, the number of channel availability parameters having a higher number of bits will increase.

Expanding the uncertainty region to enhance the sensing performance will of course incur a greater signalling cost. Nonetheless, regardless of the changes of $\Delta_1$, certain embodiments described herein can offer a better sensing result than the conventional multi-threshold sensing scheme since the conventional sensing scheme requires a greater signalling cost for the same level of sensing performance. With regard to the scheme that utilises fully soft information at both the source node and the relay node (and which does not encode the soft information in a channel availability parameter), such a scheme does not involve making any decisions at the relay node, therefore the performance is not dependent on the size of the uncertainty region.

Figure 9:
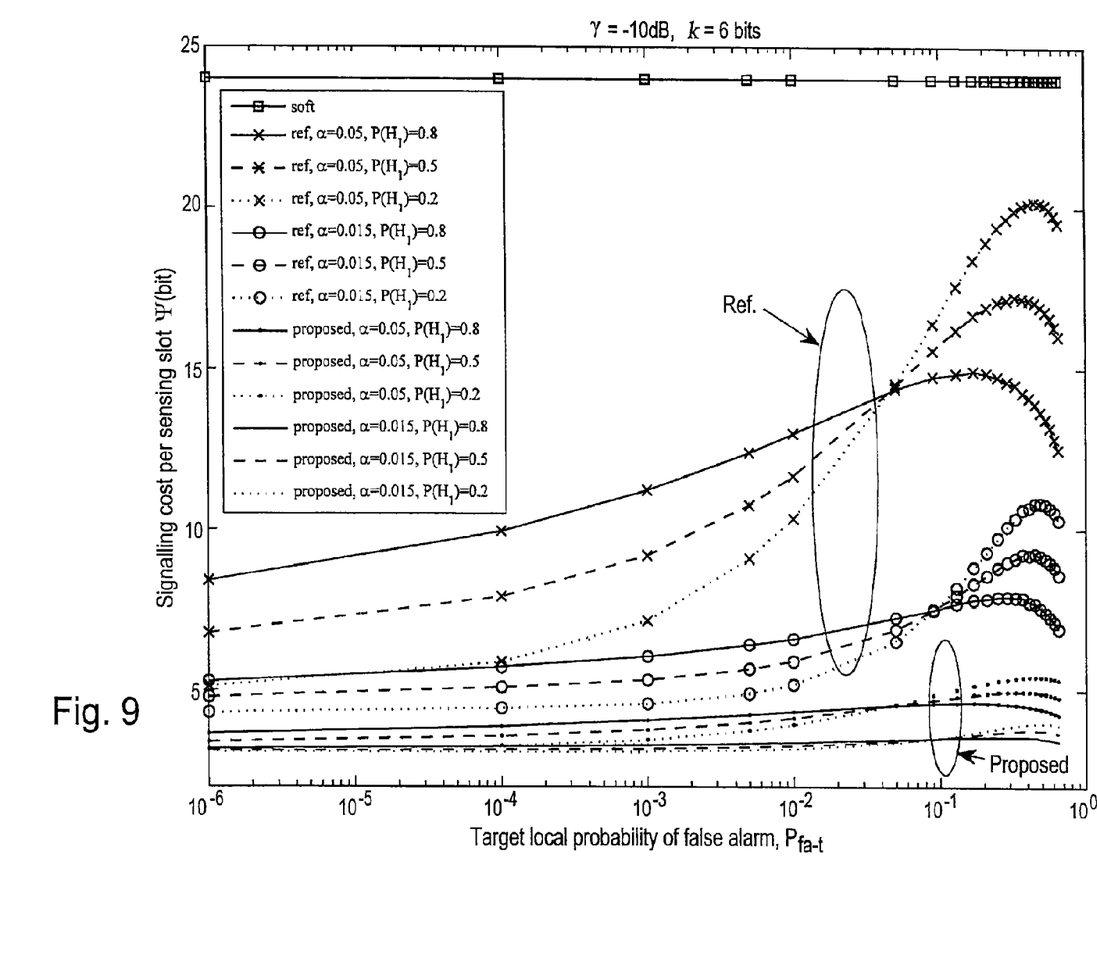
FIG. 9 shows signalling cost comparisons between three sensing schemes according to embodiments described herein.

FIG. 9 shows the signalling cost $\psi(P(\mathcal{H}_1)+P(\mathcal{H}_0)=1)$ of different sensing schemes as the function of the target local probability of false alarm $P_{fa\_t}$. For the conventional multi-threshold sensing scheme, k=6 is set as the number of bits used for sensing information signalling when the test statistic $T_m(y)$ falls into the uncertainty region ($\lambda_2 < T_m(y) \leq \lambda_1$). The impacts of different prior probabilities of the hypotheses ($P(\mathcal{H}_1), P(\mathcal{H}_0)$) and the size of the uncertainty regions on the signalling cost are also shown. As shown in FIG. 9, embodiments described herein (which are labelled as "proposed" in FIG. 9) have a lower signalling cost than the conventional schemes (labelled as "ref" in FIG. 9), for different combinations of $P(\mathcal{H}_1), P(\mathcal{H}_0)$ and uncertainty regions. Here it is noted that the signalling cost of the full-soft scheme remains constant regardless of the varying of $P_{fa\_t}$, because the observations received by all relay nodes will be sent back directly to the source node without a local decision making process (i.e. without being encoded in a channel availability parameter). In other words, a $P_{fa\_t}$-related threshold λ is not applied in the full-soft scheme.

As expected, when the same prior probabilities of hypotheses are given, an expansion of the uncertainty region (e.g., α=0.05) results in higher signalling costs for both the conventional sensing schemes and described embodiments. However, the schemes according to embodiments described herein still maintain a lower signalling cost than the conventional schemes.

Figure 10:
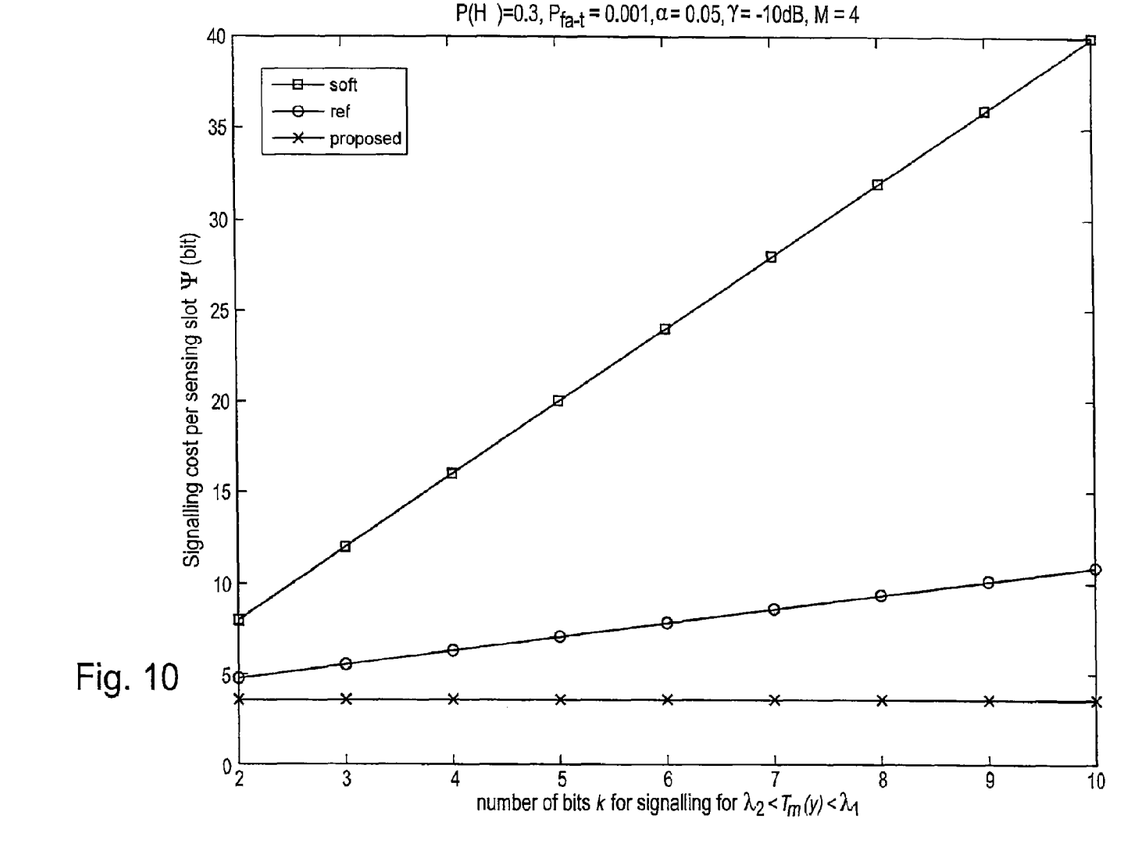
FIG. 10 shows signalling cost as a function of the number of bits used for sensing information in embodiments described herein.

The impact of the number of signalling bits k on the total signalling cost ψ per sensing slot is shown in FIG. 10. FIG. 10 shows that, for a scheme in accordance with an embodiment of the present invention, in which there is a fixed uncertainty region ($\lambda_2 < T_m(y) \leq \lambda_1$), ψ remains unchanged regardless of variations in k. The reason for this is that only two bits are allocated to the channel availability parameter in the uncertainty region.

As expected, the full-soft scheme requires the heaviest signalling cost (ψ=Mk). The signalling cost occurred for a conventional double threshold sensing scheme (labelled "Ref" in FIG. 10) also increases as k increases. A scheme in accordance with an embodiment as described herein has the lowest signalling cost, compared to the full-soft and conventional double threshold sensing schemes. Meanwhile the scheme in accordance with a described embodiment provides a better sensing performance than that of the conventional double threshold sensing, as confirmed in FIG. 7.

Thus, the comparisons with the full-soft cooperative sensing scheme and conventional multi-threshold sensing scheme demonstrate that certain embodiments can offer advantages in terms of both sensing performance and the amount of feedback required (i.e., signalling cost).

While certain embodiments have been described, these embodiments have been presented by way of example only, and are not intended to limit the scope of the invention. For example, whilst the above discussion has been directed mainly towards embodiments in which the relay node transmits a channel availability parameter to the source node, it is possible in other embodiments that the source node may instead transmit a channel availability parameter to the relay node. The relay node may then, for example, obtain the sensing result by combining the channel availability parameter with its own test statistic. Doing so may help to ensure an effective use of resources, taking into consideration hardware demands and the battery performance of the source and relay nodes. For example, where the source node has a limited battery life remaining, or a limited hardware computation capability, it may be preferable for the relay node to carry out a greater share of the calculations involved.

Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

The invention claimed is:

1. A system comprising a source node and a relay node,
   the relay node being configured to perform energy sensing of a radio spectrum to provide first sensing data indicating the availability of a signal channel at the relay node,
   the source node being configured to perform energy sensing of the radio spectrum to provide second sensing data indicating the availability of the signal channel at the source node,
   wherein one or other of the relay node and source node is configured to generate a channel availability parameter based on the first or second sensing data, respectively,
   the channel availability parameter comprising a smaller number of bits of information than whichever of the first or second sensing data is used to generate the channel availability parameter, the source node being configured to determine whether to send message information to the relay node based on a sensing result obtained by combining the channel availability parameter with whichever one of the first and second sensing data is not used to generate the channel availability parameter.

2. A system according to claim 1, wherein
the relay node is configured to generate the channel availability parameter based on the first sensing data and to transmit the channel availability parameter to the source node,
the source node being configured to obtain the sensing result by combining the channel availability parameter with the second sensing data.

3. A system according to claim 1, wherein
the source node is configured to generate the channel availability parameter based on the second sensing data and to transmit the channel availability parameter to the relay node,
the relay node being configured to obtain the sensing result by combining the channel availability parameter with the first sensing data,
the relay node being further configured to transmit the sensing result to the source node.

4. A system according to claim 1, wherein
the source node and relay node are configured to repeat energy sensing over a plurality of time intervals to thereby provide respective first and second sensing data during each one of the plurality of time intervals,
the source node and relay node each being configured to generate a respective n-bit test statistic based on the average energy sensed in each time interval, the test statistic indicating the availability of the signal channel at the source node and relay node, respectively,
wherein the channel availability parameter is generated based on the value of the test statistic and the number of bits used to generate the channel availability parameter is less than n.

5. A system according to claim 4, wherein the source node is configured to determine whether to send message information to the relay node based on a sensing result obtained by combining the channel availability parameter with the test statistic of whichever one of the source and relay nodes does not generate the channel availability parameter.

6. A system according to claim 4, wherein the number of bits used in the channel availability parameter is dependent on the magnitude of the test statistic generated by the node that generates the channel availability parameter.

7. A system according to claim 6,
wherein the node used to generate the channel availability parameter defines a first energy threshold, and
when the test statistic used to generate the channel availability parameter is above the first threshold, the number of bits in the channel availability parameter is set to a first value, and
when the test statistic used to generate the channel availability parameter is below the first threshold, the number of bits in the channel availability parameter is set to a second value.

8. A system according to claim 7,
wherein the node used to generate the channel availability parameter defines first and second energy thresholds, the second energy threshold being higher than the first energy threshold, wherein
when the test statistic used to generate the channel availability parameter is below the first threshold or above the second threshold the number of bits in the channel availability parameter is set to a first value, and
when the test statistic used to generate the channel availability parameter is between the first and second thresholds, the number of bits in the channel availability parameter is set to a second value.

9. A system according to claim 8, wherein the second value is greater than the first value.

10. A system according to claim 8, wherein the first and second thresholds can be varied by the node used to generate the channel availability parameter.

11. A system according to claim 1, comprising a plurality of relay nodes, the source node forming a respective pair of nodes with each one of the relay nodes,
wherein for each pair of nodes:
the relay node is configured to perform energy sensing of the radio spectrum to provide first sensing data indicating the availability of a signal channel at the relay node,
the source node is configured to perform energy sensing of the radio spectrum to provide second sensing data indicating the availability of the signal channel at the source node,
wherein one or other of the relay node and source node is configured to generate a channel availability parameter based on the first or second sensing data, respectively,
the channel availability parameter comprising a smaller number of bits of information than whichever of the first or second sensing data is used to generate the channel availability parameter,
the source node being configured to determine whether to send message information to the relay node based on a sensing result obtained by combining the channel availability parameter with whichever one of the first and second sensing data is not used to generate the channel availability parameter.

12. A system according claim 1, comprising a plurality of secondary relay nodes, wherein the relay node forms a respective pair of nodes with each of the secondary relay nodes,
wherein
the source node is configured to generate the channel availability parameter based on the second sensing data and to transmit the channel availability parameter to the relay node,
each one of the secondary relay nodes is configured to perform energy sensing of the radio spectrum to provide sensing data indicating the availability of the signal channel at the respective secondary relay node,
each one of the secondary relay nodes is configured to generate a respective channel availability parameter based on its respective sensing data, wherein each channel availability parameter comprises a smaller number of bits of information than the sensing data used to generate the respective channel availability parameter,
each one of the secondary relay nodes being configured to transmit its respective channel availability to the relay node,
the relay node being configured to obtain a respective sensing result for each secondary relay node by combining the respective channel availability parameter with the first sensing data,
the relay node being further configured to transmit the respective sensing result to the source node.

13. A signal node for communicating with a second signal node in a network, the second signal node being configured to perform energy sensing of a radio spectrum to provide first sensing data indicating the availability of a signal channel at the second signal node and to generate a channel availability parameter based on the first sensing data, the channel availability parameter comprising fewer bits of information than the first sensing data, wherein the signal node is configured to perform energy sensing of the radio spectrum to provide second sensing data indicating the availability of the signal channel at the signal node, and the signal node is configured to receive the channel availability parameter from the second signal node and to combine the channel availability parameter with the second sensing data to obtain a sensing result, the sensing result being used to determine whether or not information is to be exchanged between the signal node and second signal node using the signal channel.

14. A signal node for communicating with a second signal node in a network, the second signal node being configured to perform energy sensing of a radio spectrum to provide first sensing data indicating the availability of a signal channel at the second signal node and to combine information received from the signal node with the first sensing data to obtain a sensing result, the sensing result being used to determine whether information is to be exchanged between the signal node and second signal node across the signal channel, wherein the signal node is configured to perform energy sensing of the radio spectrum to provide second sensing data indicating the availability of the signal channel at the signal node and to generate a channel availability parameter based on the second sensing data, the channel availability parameter comprising fewer bits than the second sensing data, the signal node being configured to transmit the channel availability parameter to the second signal node to be combined with the first sensing data in order to obtain the sensing result.

15. A method for determining whether to transmit message information from a source node to a relay node in a network, the method comprising:

performing energy sensing of a radio spectrum at the relay node to provide first sensing data indicating the availability of a signal channel at the relay node, performing energy sensing of the radio spectrum at the source node to provide second sensing data indicating the availability of the signal channel at the source node, using the first or second sensing data to generate a channel availability parameter for the relay node or source node respectively, the channel availability parameter comprising a smaller number of bits of information than whichever of the first or second sensing data is used to generate the channel availability parameter, transmitting the channel availability parameter from whichever one of the source or relay node is used to generate the channel availability parameter to the other of the source or relay node, obtaining a sensing result by combining the channel availability parameter with whichever of the first or second sensing data is not used to generate the channel availability parameter, determining whether to send message information from the source node to the relay node based on the sensing result.

16. A method according to claim 15, wherein
the channel availability parameter is generated using the first sensing data, the channel availability parameter being transmitted from the relay node to the source node, and the sensing result is obtained by combining the channel availability parameter with the second sensing data.

17. A method according to claim 15, wherein
the channel availability parameter is generated using the second sensing data, the channel availability parameter being transmitted from the source node to the relay node, and the sensing result is obtained by combining the channel availability parameter with the first sensing data, and the sensing result is transmitted from the relay node to the source node.

18. A method according to claim 15, comprising:
repeating the energy sensing at the source node and relay node over a plurality of time intervals to thereby provide respective first and second sensing data during each one of the plurality of time intervals, generating a respective n-bit test statistic for the source node and relay nodes, wherein the test statistic is based on the average energy sensed in each time interval, generating the channel availability parameter based on the value of the test statistic, wherein the number of bits used to generate the channel availability parameter is less than n.

19. A method according to claim 18, wherein the sensing result is obtained by combining the channel availability parameter with the test statistic of whichever one of the source and relay nodes does not generate the channel availability parameter.

20. A method according to claim 18, wherein the number of bits used in the channel availability parameter is dependent on the energy sensed by the node that generates the channel availability parameter.

21. A method according to claim 20, comprising defining a first energy threshold at the node used to generate the channel availability parameter,
wherein
when the test statistic used to generate the channel availability parameter is above the first threshold, the number of bits in the channel availability parameter is set to a first value, and
when the test statistic used to generate the channel availability parameter is below the first threshold, the number of bits in the channel availability parameter is set to a second value.

22. A method according to claim 21, comprising
defining first and second energy thresholds at the node used to generate the channel availability parameter, the second energy threshold being higher than the first energy threshold,
wherein
when the test statistic used to generate the channel availability parameter is below the first threshold or above the second threshold the number of bits in the channel availability parameter is set to a first value, and
when the test statistic used to generate the channel availability parameter is between the first and second thresholds, the number of bits in the channel availability parameter is set to a second value.

23. A method according to claim 22, wherein the second value is greater than the first value.

24. A method according to claim 22, wherein the first and second energy thresholds are variable thresholds.

* * * * *